(12) United States Patent
Shao et al.

(10) Patent No.: US 11,176,019 B2
(45) Date of Patent: Nov. 16, 2021

(54) AUTOMATED BREAKPOINT CREATION

(71) Applicant: INTERNATIONAL BUSINESS MACHINES CORPORATION, Armonk, NY (US)

(72) Inventors: Liujia Shao, Markham (CA); Yan Luo, Concord (CA); Yan Xu, Richardmon Hill (CA); Sibin Fan, Markham (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/837,275

(22) Filed: Apr. 1, 2020

(65) Prior Publication Data
US 2021/0311853 A1 Oct. 7, 2021

(51) Int. Cl.
*G06F 9/44* (2018.01)
*G06F 11/36* (2006.01)
*G06K 9/62* (2006.01)
*G06N 20/00* (2019.01)

(52) U.S. Cl.
CPC ...... *G06F 11/3604* (2013.01); *G06F 11/3664* (2013.01); *G06K 9/6218* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 9,672,355 B2 | 6/2017 | Titonis et al. | |
| 2013/0097706 A1 | 4/2013 | Titonis et al. | |
| 2016/0224461 A1* | 8/2016 | Araya | G06F 11/3644 |
| 2016/0342903 A1* | 11/2016 | Shumpert | G06F 11/079 |
| 2018/0225191 A1* | 8/2018 | Carey | G06F 11/366 |
| 2019/0095313 A1* | 3/2019 | Xu | G06K 9/6282 |
| 2019/0238593 A1 | 8/2019 | Larmuseau et al. | |
| 2019/0287029 A1* | 9/2019 | Sobran | G06N 20/00 |
| 2019/0303116 A1* | 10/2019 | Ding | G06F 8/33 |
| 2020/0097389 A1* | 3/2020 | Smith | G06N 3/084 |
| 2020/0201727 A1* | 6/2020 | Nie | G06F 11/2257 |
| 2020/0250477 A1* | 8/2020 | Barthur | G06F 9/542 |
| 2020/0257614 A1* | 8/2020 | Davis | G06F 11/3612 |
| 2021/0034450 A1* | 2/2021 | Vishwakarma | G06F 3/0653 |

(Continued)

OTHER PUBLICATIONS

Ahmadi, Mansour "Malware detection by behavioral sequential patterns", Computer Fraud & Security, Aug. 2013, pp. 11-19.

(Continued)

*Primary Examiner* — Insun Kang
(74) *Attorney, Agent, or Firm* — Cantor Colburn LLP; Peter Wang (57) ABSTRACT

Methods, systems, and computer program products for automated breakpoint creation using machine learning are provided. Aspects include obtaining a bug report for a software and source code for the software and analyzing the bug report to determine a bug type for the bug report, where analyzing the bug report includes using a bug type labeling model. Aspects also include analyzing the source code to identify a code snippet in the source code based on the bug type, where analyzing the source code includes using a source code detection model. Aspects further include inserting a breakpoint in the source code at the code snippet.

18 Claims, 6 Drawing Sheets

(56) References Cited

U.S. PATENT DOCUMENTS

2021/0089647 A1* 3/2021 Suwad ............... G06F 9/45558
2021/0103489 A1* 4/2021 Burch ............... G06F 11/0736

OTHER PUBLICATIONS

Catal, Cagatay "Practical development of an Eclipse-based software fault prediction tool using Naive Bayes algorithm", Expert Systems with Applications 38 (2011), pp. 2347-2353.

Neuhaus, Stephen et al. "Predicting Vulnerable Software Components", CCS'07, Oct. 29-Nov. 2, 2007; 12 pgs.

Novkovic, Igor "Can malware analysts be assisted in their work using techniques from machine learning?", MIPRO May 30-Jun. 3, 2016; pp. 1408-1413.

Pewny, Jannik et al. "Leveraging Semantic Signatures for Bug Search in Binary Programs", ACSAC Dec. 8-12, 2014; retrieved at: http://dx.doi.org/10.1145/2664243.2664269; 10 pgs.

Scandariato, Riccardo et al. "Predicting Vulnerable Software Components via Text Mining", in IEEE Transactions on Software Engineering, vol. 40, No. 10, Oct. 1, 2014, retrieved from: http://dx.doi.org/10.1109/TSE.2014.2340398; pp. 993-1006.

* cited by examiner

AUTOMATED BREAKPOINT CREATION

BACKGROUND

The present invention generally relates to debugging software, and more specifically, to the automated creation of breakpoints in a debugger using machine learning.

Software development and maintenance traditionally involve completing multiple debugging tasks. In general, debugging is a process to locate and correct faults in a software program. In practice, debugging requires problem-solving skills, expertise and tool support. During conventional debugging processes, developers use their prior knowledge, error messages and other information to generate hypotheses to locate bugs, or errors, in a program. After locating which area of program code might have bugs, developers usually set breakpoints that enable them to pause the execution of a program so that they can check variable states at a given point and test their hypothesis.

Ideally, error messages together with proper debugging information (such as exception stack trace, log, steps to reproduce and test data) can help developers locate and fix bugs, or errors, in the software code. However, it is not always the case because debugging is a complex task. Some complex root causes of some bugs might be multithreading errors, device configuration errors, localization errors, et al. These types of errors usually do not have clear debugging information and often require developers to gather context, proposes a hypothesis, step though breakpoints to verify and test a hypothesis. Apart from the complexity of locating bugs, it is challenging for developers to debug unfamiliar code, such as legacy code, with limited development experiences.

SUMMARY

Embodiments of the present invention are directed to a computer-implemented method for automated breakpoint creation using machine learning. A non-limiting example of the computer-implemented method includes obtaining a bug report for a software and source code for the software and analyzing the bug report to determine a bug type for the bug report, where analyzing the bug report includes using a bug type labeling model. The method also includes analyzing the source code to identify a code snippet in the source code based on the bug type, where analyzing the source code includes using a source code detection model. The method further includes inserting a breakpoint in the source code at the code snippet.

Embodiments of the present invention are directed to a system for automated breakpoint creation using machine learning. A non-limiting example of the system includes a processor coupled to a memory, the processor configured to perform obtaining a bug report for a software and source code for the software and analyzing the bug report to determine a bug type for the bug report, where analyzing the bug report includes using a bug type labeling model. The processor is also configured to perform analyzing the source code to identify a code snippet in the source code based on the bug type, where analyzing the source code includes using a source code detection model. The processor is further configured to perform inserting a breakpoint in the source code at the code snippet.

Embodiments of the invention are directed to a computer program product for automated breakpoint creation using machine learning, the computer program product comprising a computer readable storage medium having program instructions embodied therewith. The program instructions are executable by a processor to cause the processor to perform a method. A non-limiting example of the method includes obtaining a bug report for a software and source code for the software and analyzing the bug report to determine a bug type for the bug report, where analyzing the bug report includes using a bug type labeling model. The method also includes analyzing the source code to identify a code snippet in the source code based on the bug type, where analyzing the source code includes using a source code detection model. The method further includes inserting a breakpoint in the source code at the code snippet.

Additional technical features and benefits are realized through the techniques of the present invention. Embodiments and aspects of the invention are described in detail herein and are considered a part of the claimed subject matter. For a better understanding, refer to the detailed description and the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls). Software as a Service (SaaS): is a software distribution model in which a third-party provider hosts applications and makes them available to customers over the Internet. SaaS is one of three main categories of cloud computing, alongside infrastructure as a service (IaaS) and platform as a service (PaaS). PaaS is a cloud computing model in which a third-party provider delivers hardware and software tools—usually those needed for application development—to users over the internet. A PaaS provider hosts the hardware and software on its own infrastructure. As a result, PaaS frees developers from having to install in-house hardware and software to develop or run a new application.

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
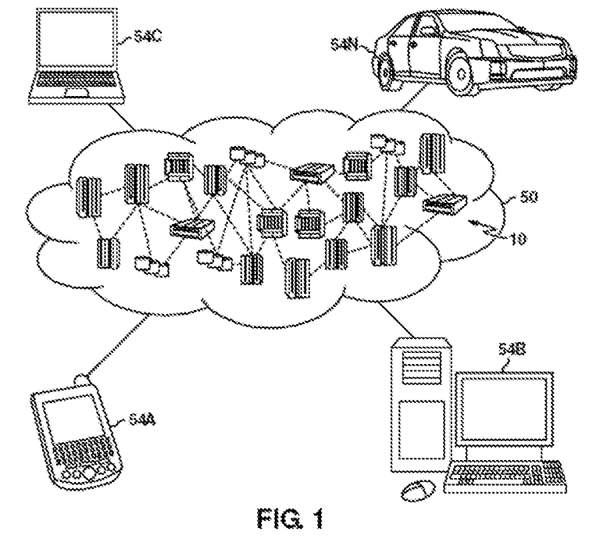
FIG. 1 depicts a cloud computing environment according to one or more embodiments of the present invention.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
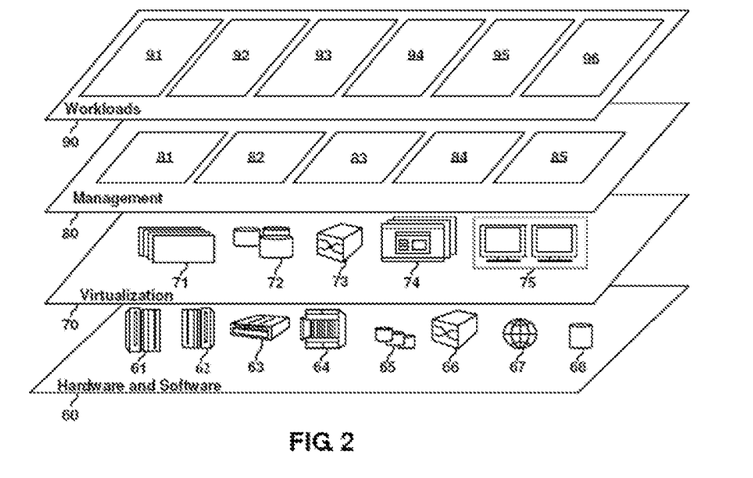
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and automated breakpoint creation using machine learning 96.

Figure 3:
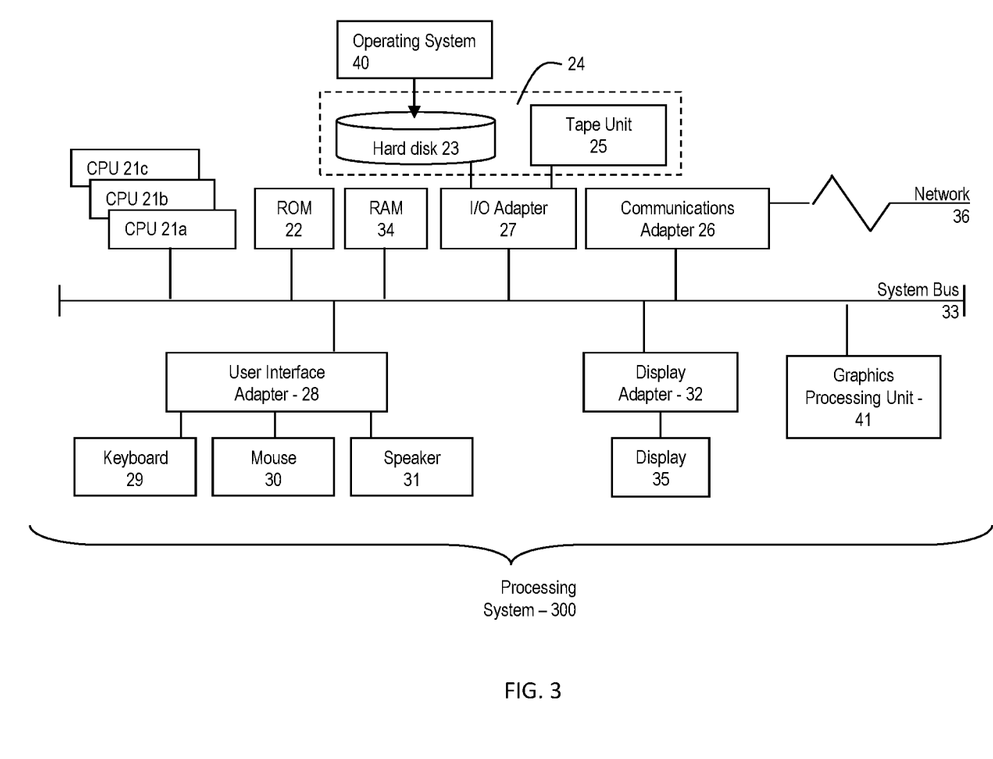
FIG. 3 depicts a block diagram of a computer system for use in implementing one or more embodiments of the present invention.

Referring to FIG. 3, there is shown an embodiment of a processing system 300 for implementing the teachings herein. In this embodiment, the system 300 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 300.

FIG. 3 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 300 may be stored in mass storage 24. A network adapter 26 interconnects bus 33 with an outside network 36 enabling data processing system 300 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 300 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 3, the system 300 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 3.

Figure 4:
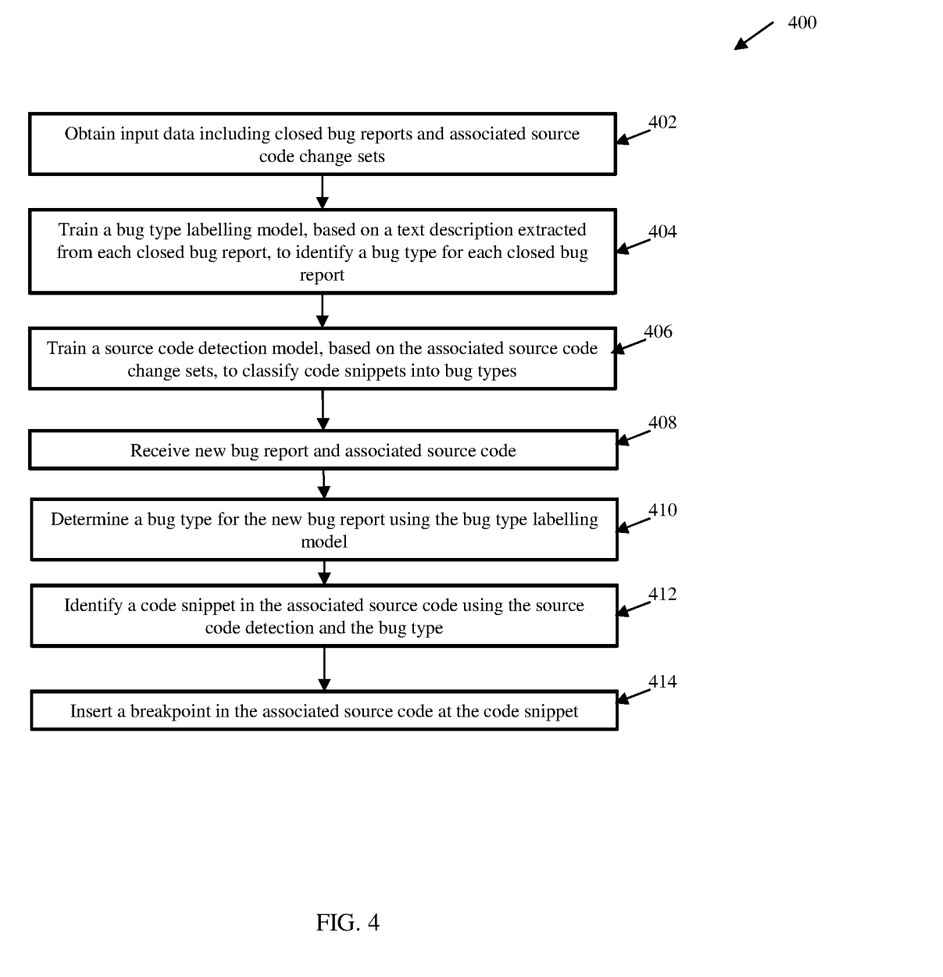
FIG. 4 depicts a flow diagram of a method for automated breakpoint creation using machine learning according to one or more embodiments of the present invention.

Turning now to an overview of technologies that are more specifically relevant to aspects of the invention, FIG. 4 depicts a flow diagram of a method 400 for automated breakpoint creation using machine learning according to one or more embodiments of the present invention. In exemplary embodiments, machine learning methods are used for automatically locating code snippets that contain bugs and automatically inserting breakpoints for users in order to help them debug. The method 400 begins at block 402 by obtaining input data including closed bug reports and associated source code change sets. Next, as shown at block 404, the method 400 includes training a bug type labeling model, based on a text description extracted from each closed bug report, to identify a bug type for each closed bug report. In exemplary embodiments, the bug type labeling model is trained using clustering machine learning techniques. The method 400 also includes training a source code detection model, based on the associated source code change sets, to classify code snippets into bug types, as shown at block 406. In exemplary embodiments, the source code detection model is trained using deep learning machine learning techniques. Once trained, these models will be able to identify code snippets that might be responsible for reported bugs and provide breakpoints to the closest bug type.

Next, as shown at block 408, the method 400 includes receiving a new bug report and associated source code. The method 400 also includes determining a bug type for the new bug report using the bug type labeling model, as shown at block 410. Once the bug type is identified, the method 400, as shown at block 412, includes identifying a code snippet in the associated source code using the source code detection model and the bug type. The method 400 concludes at block 414 by inserting a breakpoint in the associated source code at the code snippet. In exemplary embodiments, the method 400 is configured to rapidly digest and analyze large repositories and source code change sets and bug reports without requiring that the source code be compiled.

In an exemplary embodiment, various machine learning methods can be used to achieve automated breakpoints toggling in the debugger. Such machine learning methods include, but are not limited to, traditional machine learning with human-defined labels and deep learning without pre-defined human labeling data.

In one embodiment, traditional machine learning with human-defined labels is used to achieve automated breakpoints toggling in the debugger. This approach requires two data sources, closed issue descriptions and associated code change sets, also referred to as commits. In one embodiment, the closed issue descriptions and associated code change sets are obtained from open source projects and the datasets retrieved can be considerably large. In most cases, commit history and closed issue descriptions are related because developers usually indicate which issues they have solved when committing code changes. In exemplary embodiments, closed issue descriptions usually have detailed descriptions of the bugs or errors found by the developers and can be mapped to a pre-defined bug type by building a clustering model. Therefore, each code change set can be related to the corresponding bug type or label.

In exemplary embodiments, two machine learning models are used to perform automated breakpoints toggling in the debugger. One machine learning model is configured to learn the relationships between the text description of closed issues descriptions and bug types by using clustering methods such as K-mean clustering. The second machine learning models is a classification model that is configured to learn patterns or features in code change sets according to their corresponding bug types.

In exemplary embodiments, a bug type labeling model is created to identify bug types from received bug reports. The dataset that is used to train the bug type labeling model is a text description of issues with associated code. In general, bug types are defined by experienced developers. In one embodiment, the bug type labeling model is created by applying one or more clustering models such as K-mean, agglomerative hierarchical clustering.

In exemplary embodiments, a source code detection model is created to identify portions of code, referred to as code snippets, that are likely to correspond to a given bug type. The training data used to create the source code detection model is code snippets from code change sets. In one embodiment, the code snippets are converted into predictive features using embedding (e.g. CBOW, Skip-Gram), or embedding layer of recurrent neural network (RNN) and its variants. In other embodiments, word vectors are trained for specific programming languages. In some embodiments, feature engineering is used to inject new features to the training data. In exemplary embodiments, the source code detection model is built using complex models such as Recurrent Neural Network (RNN), Long Short-Term Memory (LSTM) and gated recurrent units (GRU). In some embodiments, GRU simplify the training process while reducing the amount of necessary computational resources.

In an exemplary embodiment, holdout or K-fold cross-validation methods are used to observe model performance. Based on the validation results, one or more of the following are performed: model hyperparameters are fine-tuned; model structures adjusted, and iterating feature engineering stage to add predictive features to the models.

Once the two models have been created and trained when a developer gets stuck and he/she create a new bug report. The bug type labeling model is used to analyze the bug report and determine a bug type associated with the bug report. Next, the source code detection model is used to predict bug types for each code snippet of the whole codebase and to match the closest ones to the identified bug type. Once the best match is found, a breakpoint is automatically added to the code for the developer.

In one embodiment, deep learning without pre-defined human labeling data is used to achieve automated breakpoints toggling in the debugger. In exemplary embodiments, this approach uses a similar dataset to train models as used in traditional machine learning with human-defined labels.

In exemplary embodiments, a bug type labeling model is configured to convert bug descriptions into feature vectors, for example by training a text encoder. In one embodiment, the bug type labeling model is implemented by training an unsupervised language model. For example, using an AWD-LSTM to generate embeddings for sentences.

In exemplary embodiments, a source code detection model is configured to convert code snippets of source code into feature vectors. Commit messages are comments used by developers to label changes to source code and commit messages are often related to bug descriptions. In one embodiment, the commit messages and source code change sets are used as pairs to train a sequence-to-sequence model to predict commit message given code snippets in a source code change set. Once trained, the source code detection model is configured to map code snippets to sentence embedding space by extracting code encoder from the sequence-to-sequence model and adding dense layers for fine-tuning. Many techniques can be adopted to build such an encoder.

Once the source code detection model and the bug type labeling model are trained, there are two sets of feature vectors, one set for code snippets and one set for bug descriptions. In exemplary embodiments, there is a strong relationship between feature vectors for code snippets and feature vectors for bug descriptions. For example, a feature vector of a bug description (issue description) is very similar to a code snippet in changeset that solved the issue(bug). Accordingly, by using the two models to analyze new bug reports for associated source code, new and unseen bug issues can be identified.

In one example, when a developer finds a new bug they create a bug report with a textual descriptions of the bug. This bug report input into the text encoder, i.e., the bug type labeling model, to extract a feature vector of that bug. In addition, the source code associated with the new bug is input into a code encoder, i.e., the source code detection model, to extract feature vectors for code snippets in source code. By calculating the similarities (such as cosine similarity) between the feature vector of the bug description and feature vectors of code snippets, the feature vector of code snippet that has the closest similarity of the feature vector of the bug description can be identified. The identified code snippet is very likely to be the one that contains the new bug, and a breakpoint can be automatically set at the location of the code snippet.

Figure 5:
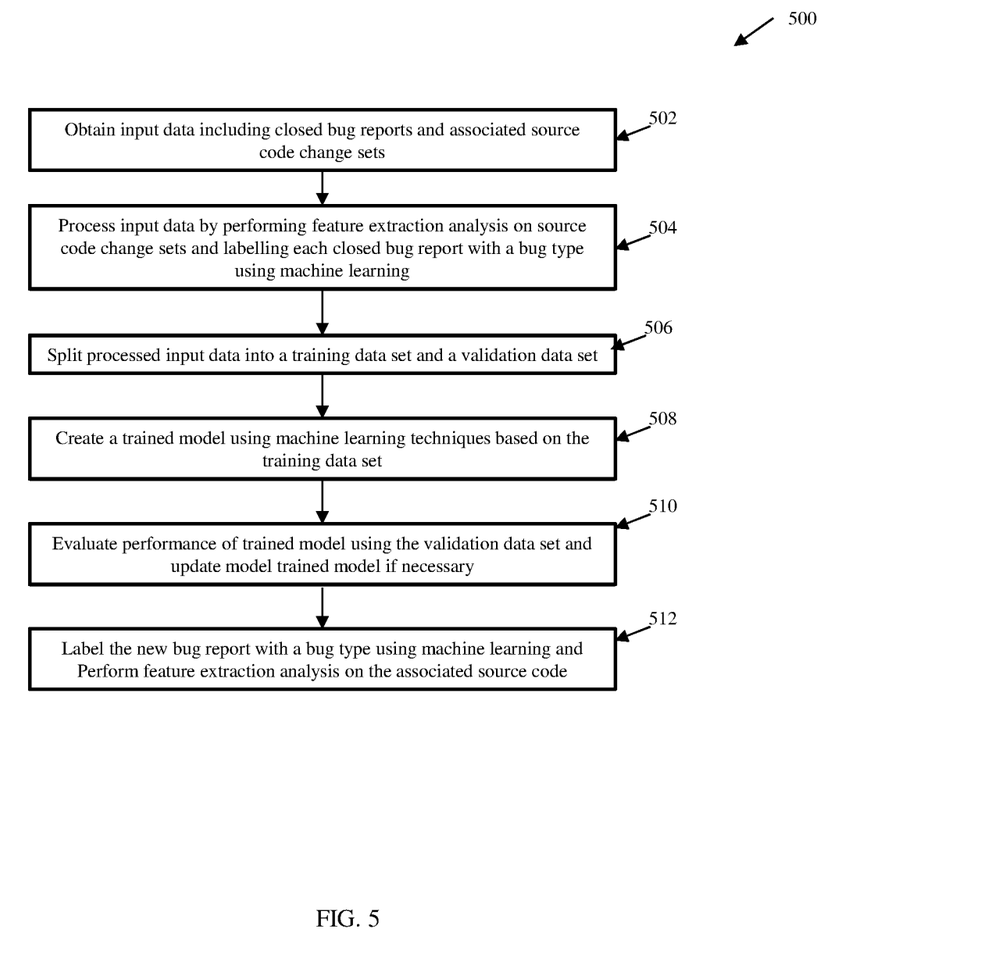
FIG. 5 depicts a flow diagram of another method for automated breakpoint creation using machine learning according to one or more embodiments of the present invention.

Referring now to FIG. 5 a flow diagram of a method 500 for automated breakpoint creation using machine learning according to one or more embodiments of the present invention is shown. As shown at block 502, the method 500 includes obtaining input data including closed bug reports and associated source code change sets. Next, as shown at block 504, the method includes processing input data by performing feature extraction analysis on source code change sets and labeling each closed bug report with a bug type using machine learning. The method 500 also includes splitting the processed input data into a training data set and a validation data set, as shown at block 506.

Once the input data has been processed and split, the method 500 includes creating one or more trained models, such as the bug type labeling model and the source code detection model using machine learning techniques based on the training data set, as shown at block 508. Next, as shown at block 510, the method 500 includes evaluating the performance of trained models using the validation data set and updating model trained model if necessary. After the models are complete, i.e., after training and meeting a threshold performance during the evaluation, the models are used to evaluate a new bug report and associated source code. The method 500 concludes a block 512 by labeling the new bug report with a bug type using machine learning and Perform feature extraction analysis on the associated source code.

In one embodiment, a computer-implemented process for automated breakpoints toggling in a debugger using machine learning is provided. The method includes training a text encoder to convert descriptions of program bugs, including support vector machine issues into feature vectors using a predetermined bug type labeling model including training using an unsupervised language model to represent bug descriptions using feature vectors. The method also includes generating a code encoder, in a source code detect model, having a capability to convert code snippets into feature vectors including use of commit messages related to the bug descriptions leveraging the commit messages and source code changesets as pairs to train a sequence-to-sequence model to predict a commit message given code snippets in a source code changeset. The method further includes tuning the source code detect model to predict feature vectors for code snippets in the source code changeset by mapping the code snippets to sentence embedding space by extracting the code encoder from the sequence-to-sequence model and adding dense layers for fine-tuning enabling code snippets to be mapped by corresponding vectors. The method also includes, in response to receiving feature vectors for code snippets and feature vectors for bug descriptions), identifying a relationship by calculating a similarity between the feature vectors for code snippets and the feature vectors for bug descriptions. The method further includes identifying, for a predetermined threshold, the feature vector of code snippets having the closest similarity to the feature vector of the bug description, wherein an associated code snippet is likely to contain a respective bug of the bug description and programmatically setting breakpoints in the code snippets.

Additional processes may also be included. It should be understood that the processes depicted in FIGS. 4 and 5 represent illustrations, and that other processes may be added or existing processes may be removed, modified, or rearranged without departing from the scope and spirit of the present disclosure.

Figure 6:
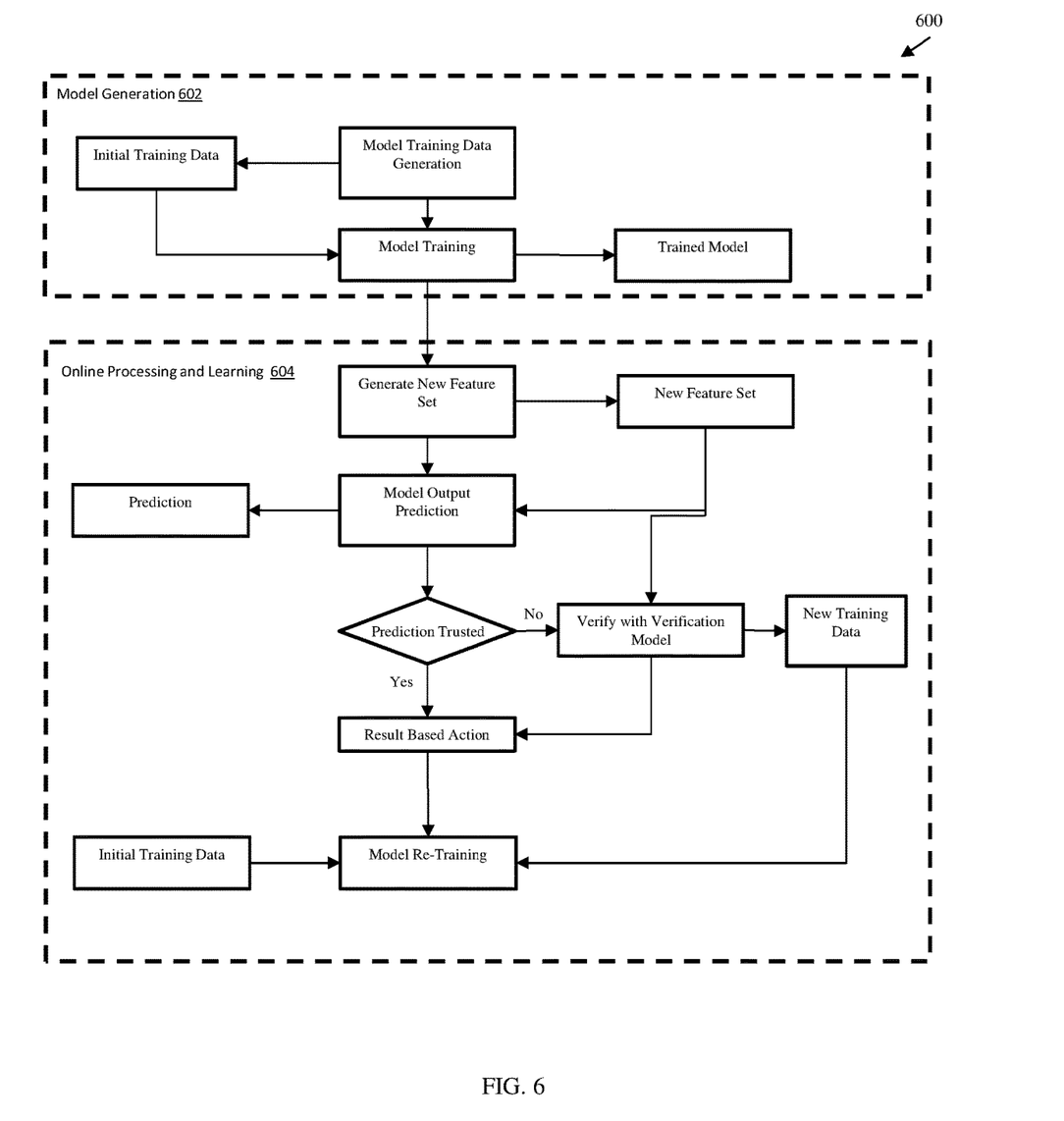
FIG. 6 depicts a flow diagram of a method for training a machine learning model in a verifiable prediction environment according to one or more embodiments of the invention.

Referring now to FIG. 6 depicts a flow diagram of training a machine learning model in a verifiable prediction environment according to one or more embodiments of the invention. During the model generation 502 stage, initial model training data is produced by generating a number of input feature sets with differing feature values (for example, randomly selected feature values using feature probability density profiles), with corresponding trusted output values determined using a verification model. The initial trained model is fit from this training data.

In one or more embodiments, during the online prediction and learning (e.g., online processing) phase 504, new feature sets can be generated and predictions can be made in a processing loop using these newly generated feature sets. Since the model is not 100% accurate, some gauge of model output prediction accuracy is used to determine if the prediction can be trusted. If the prediction cannot be trusted (e.g. decision block results in a No'), to some level of confidence, the verification model is used to verify the result. The prediction (e.g., decision block results in a 'Yes'), or verified prediction (verified with verification model), the result is then used to perform some immediate result based action. Or, the action can be storing the result for later processing. Verification of predictions produces trusted data samples that can be used as new training data. The new training data can be combined with the initial training data to retrain the model, such that it incrementally becomes more accurate during the online process 504. The online prediction and learning phase 504 refers to machine learning in which data becomes available in a sequential order and is used to update our best predictor for future data at each step, as opposed to batch learning techniques which generate the best predictor by learning on the entire training data set at once. Online learning is a common technique used in areas of machine learning where it is computationally infeasible to train over the entire dataset. Computationally infeasible meaning the data set is too large to fit in a computer's main memory. By training the model in the verifiable prediction environment, the model is enhanced and becomes more accurate allowing for the online prediction and learning phase 504 to be more accurate when dealing with large data sets. When the model has been enhanced, the model can be utilized to analyze data sets to determine a decision result when the data set is inputted into the enhanced model.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was

What is claimed is:

1. A computer-implemented method for automated breakpoint creation using machine learning, the computer-implemented method comprising:
    obtaining a set of closed bug reports for a software and source code for the software and an associated source code change set;
    analyzing the set of closed bug reports to identify a bug type for the bug report, where analyzing the bug report includes using a bug type labeling model, wherein the bug type labeling model is a machine learning model that is trained based on a text bug description of a bug in the source code extracted from the set of closed bug reports;
    analyzing the source code to identify a code snippet in the source code that matches the closest to the identified bug type based on the bug type, where analyzing the source code includes using a source code detection model, wherein the source code detection model is a machine learning model trained using the source code change set associated with the set of closed bug reports; and
    automatically inserting a breakpoint in the source code at the identified code snippet to identify the code snippet to a user debugging the source code.

2. The method of claim 1, wherein the bug type labeling model is trained using an unsupervised language model to represent bug descriptions extracted from the set of closed bug reports using feature vectors.

3. The method of claim 1, wherein the bug type labeling model is trained using one or more clustering machine learning techniques.

4. The method of claim 1, wherein the source code detection model is trained using deep learning machine learning techniques.

5. The method of claim 1, wherein the source code detection model is used to assign a predicted bug type to each code snippet of the source code.

6. The method of claim 5, wherein the source code detection model is configured to match a closest predicted bug type to the bug type.

7. The method of claim 1, wherein the source code detection model is trained using closed issue descriptions that include a description of errors found by a developer and associated code change set that solved the errors.

8. A system for automated breakpoint creation using machine learning, the system comprising:
    a processor communicatively coupled to a memory, the processor configured to:
        obtain a set of closed bug reports for a software and source code for the software and an associated source code change set;
        analyze the set of closed bug reports to identify a bug type for the bug report, where analyzing the bug report includes using a bug type labeling model, wherein the bug type labeling model is a machine learning model that is trained based on a text bug description of a bug in the source code extracted from the set of closed bug reports;
        analyze the source code to identify a code snippet in the source code that matches the closest to the identified bug type based on the bug type, where analyzing the source code includes using a source code detection model, wherein the source code detection model is a machine learning model trained using the source code change set associated with the set of closed bug reports; and
        automatically insert a breakpoint in the source code at the identified code snippet to identify the code snippet to a user debugging the source code.

9. The system of claim 8, wherein the bug type labeling model is trained using an unsupervised language model to represent bug descriptions extracted from the set of closed bug reports using feature vectors.

10. The system of claim 8, wherein the bug type labeling model is trained using one or more clustering machine learning techniques.

11. The system of claim 8, wherein the source code detection model is trained using deep learning machine learning techniques.

12. The system of claim 8, wherein the source code detection model is used to assign a predicted bug type to each code snippet of the source code.

13. The system of claim 12, wherein the source code detection model is configured to match a closest predicted bug type to the bug type.

14. A computer program product for automated breakpoint creation using machine learning, the computer program product comprising a computer readable storage medium having program instructions embodied therewith, the program instructions executable by a processor to cause the processor to perform a method comprising:
    obtaining a set of closed bug reports for a software and source code for the software and an associated source code change set;
    analyzing the set of closed bug reports to identify a bug type for the bug report, where analyzing the bug report includes using a bug type labeling model, wherein the bug type labeling model is a machine learning model that is trained based on a text bug description of a bug in the source code extracted from the set of closed bug reports;
    analyzing the source code to identify a code snippet in the source code that matches the closest to the identified bug type based on the bug type, where analyzing the source code includes using a source code detection model, wherein the source code detection model is a machine learning model trained using the source code change set associated with the set of closed bug reports; and
    automatically inserting a breakpoint in the source code at the identified code snippet to identify the code snippet to a user debugging the source code.

15. The computer program product of claim 14, wherein the bug type labeling model is trained using an unsupervised language model to represent bug descriptions extracted from the set of closed bug reports using feature vectors.

16. The computer program product of claim 14, wherein the bug type labeling model is trained using one or more clustering machine learning techniques.

17. The computer program product of claim 14, wherein the source code detection model is trained using deep learning machine learning techniques.

18. The computer program product of claim 14, wherein the source code detection model is used to assign a predicted bug type to each code snippet of the source code.

* * * * *